(12) United States Patent
Wyser et al.

(10) Patent No.: US 8,697,278 B2
(45) Date of Patent: Apr. 15, 2014

(54) BATTERY CELL CASING WITH SEAL

(75) Inventors: Philipp Wyser, Appenzell (CH); Paul Wyser, Appenzell (CH); Walter Döll, Gasel (CH); Jean-Noël Fehr, Neuchâtel (CH); Urban Schnell, Münchenbuchsee (CH)

(73) Assignee: Swissbatt AG, Appenzell Steinegg (CH)

( * ) Notice: Subject to any disclaimer, the term of this patent is extended or adjusted under 35 U.S.C. 154(b) by 121 days.

(21) Appl. No.: 13/226,330

(22) Filed: Sep. 6, 2011

(65) Prior Publication Data

US 2012/0058386 A1    Mar. 8, 2012

Related U.S. Application Data

(60) Provisional application No. 61/380,347, filed on Sep. 7, 2010.

(30) Foreign Application Priority Data

Nov. 26, 2010  (EP) .................................... 10405229

(51) Int. Cl.
*H01M 2/02*    (2006.01)
*H01M 2/08*    (2006.01)

(52) U.S. Cl.
USPC ............ 429/185; 429/163; 429/164; 429/174

(58) Field of Classification Search
USPC .................................. 429/163, 164, 174, 185
See application file for complete search history.

(56) References Cited

U.S. PATENT DOCUMENTS

| | | | | |
|---|---|---|---|---|
| 6,270,921 | B1 * | 8/2001 | Kaplan et al. | 429/163 |
| 6,830,847 | B2 * | 12/2004 | Ramaswami et al. | 429/171 |
| 2003/0162436 | A1 | 8/2003 | Nakagawa | |
| 2006/0154141 | A1 | 7/2006 | Salot et al. | |

FOREIGN PATENT DOCUMENTS

| | | |
|---|---|---|
| EP | 0 164 963 A2 | 12/1985 |
| EP | 0 615 301 A1 | 3/1994 |
| JP | 37-18818 | 12/1962 |
| JP | 53-58579 | 5/1978 |
| JP | 58-37661 U | 3/1983 |
| JP | 61-85765 A | 5/1986 |
| JP | 8-203482 A | 8/1996 |
| JP | 2009-260023 A | 11/2009 |
| WO | 2009/121577 A1 | 10/2009 |
| WO | 2010/074690 A1 | 7/2010 |

OTHER PUBLICATIONS

Search Report for EP 10 40 5229.5 dated Dec. 15, 2011.

* cited by examiner

*Primary Examiner* — Tracy Dove
(74) *Attorney, Agent, or Firm* — Birch, Stewart, Kolasch & Birch, LLP

(57) ABSTRACT

A battery cell casing comprises a first casing element (1) with a first contact surface (7) and a second casing element (2) with a second contact surface (8). In an assembled position the first and second contact surfaces (7, 8) contact each other and the first and second casing elements (1, 2) encase active materials (9, 10) of a battery cell in an interior space. At least one seal layer is arranged between the first and second contact surfaces (7, 8) to seal the interior space, wherein one of first and second contact surface (7; 8) comprises a void volume layer and the other of first and second contact surface (7; 8) comprises a formable material layer, which fills voids on a surface of the void volume layer hermetically in the assembled position and forms the seal layer.

32 Claims, 1 Drawing Sheet

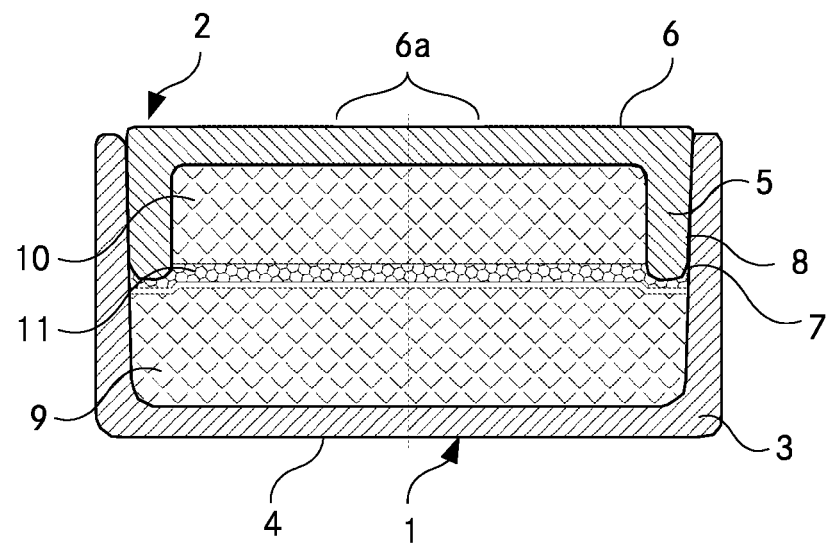

BATTERY CELL CASING WITH SEAL

CROSS REFERENCE TO CO-PENDING APPLICATIONS

This nonprovisional application claims the benefit of U.S. Provisional Application No. 61/380,347 filed on Sep. 7, 2010 and to Patent Application No. 10 405 229.5 filed in Europe, on Nov. 26, 2010. The entire contents of all of the above applications is hereby incorporated by reference.

TECHNICAL FIELD

The invention relates to a battery cell casing, comprising a first casing element with a first contact surface and a second casing element with a second contact surface, wherein in an assembled position the first and second contact surfaces contact each other and the first and second casing elements encase active materials of a battery cell in an interior space, and wherein at least one gas-tight seal layer is arranged between the first and second contact surfaces to seal the interior space.

BACKGROUND ART

According to the state of the art different kind of batteries in various forms are known, each of which is designed and used for different technical applications. In particular in the field of medical devices batteries must be small and their outside be made of biocompatible materials. However the batteries must show high energy density and long life cycles.

Batteries with a small structure are for example button batteries, which usually comprise a cup-shaped housing with a cover part. The anode and cathode materials are housed within the cup and separated by a separator from each other. The cup is covered by the cover part, wherein a sealing is located between the cup and the cover to provide a gas tight interior space. The sealing usually is provided by a rubber or plastic ring or the like. The cup and the cover respectively comprise electrical connectors to connect the button battery to an electrical circuit or consumer load. Such button batteries for example are known from EP 0 615 301 B1 (Alliant Techsystems) or US 2003/0162436 A1 (Denso Corp.). In other designs, where contacts to both electrodes are provided on the same side of the battery, an insulated feed-through such as a glass duct is needed. The provision of sealings and required separations of electrodes within the battery or the feed-through itself require a lot of space. Therefore the architecture of common button batteries mostly is bulky. Also the available space is not fully used to optimize energy density of the battery.

Other small batteries are for example thin film batteries as described in US 2006/0154141 A1 (R. Salot et al.). These batteries are produced by a thin film technique which e.g. first etches a battery space in a substrate and then builds up the battery layer by layer. Production of such batteries is very costly and time consuming.

SUMMARY OF THE INVENTION

It is an object of the invention to create a battery cell casing pertaining to the technical field initially mentioned, that provides a simple structure, optimizes the relation between battery space and energy capacity of the battery, guarantees a compact battery size and can be produced in a simple and cost-efficient manner.

The solution of the invention is specified by the features of claim 1. Preferred embodiments of the invention are specified in the dependent claims.

A battery cell casing according to the invention comprises a first casing element with a first contact surface and a second casing element with a second contact surface. In an assembled position, when the first and second casing elements are connected to each other, the first and second contact surfaces contact each other, i.e. are arranged adjacently, whereas the contact surfaces are arranged parallel to each other. Also the first and second casing elements provide an interior space to encase active materials of the battery cell. That means anode and cathode materials, electrolytes, separation layers and so on as known from common battery architectures are housed within the first and second casing element of the casing. At least one gas-tight seal layer is arranged between the first and second contact surfaces to seal the interior space of the casing. According to the invention, the seal layer is formed by an electrically insulating void volume layer on one of the first and second contact surfaces and a formable material layer on the other of the first and second contact surfaces. In the assembled position, the formable material layer fills voids on a surface of the void volume layer hermetically. The resulting seal layer is electrically insulating as well as gas-tight and therefore fulfills the demands made on such a layer.

The electrically insulating void volume layer consists in particular of a porous material such as a ceramic material. The formable material layer for example consists of a soft or flexible material, which e.g. may be deformed by pressure or tensile forces. When pushing together the first and second casing elements of the battery cell casing to the assembled position according to the invention the first and second contact surfaces are pressed onto each other such that the formable material of the formable material layer deforms into the voids on the void volume layer, such that the voids are sealed and the porous material is occluded. Therefore, the void volume layer and the formable material layer engage with each other to form a sealing layer sealing the contact between first and second casing element. The void volume layer is at least partially filled by the formable material layer and forms a gas tight and electrically insulating layer between first and second casing. The void volume layer preferably has a thickness of 1-20 µm, most preferably of 2-10 µm. The formable material layer may have a thickness of 0.5-5 µm.

A sealing of the battery cell casing according to the invention does not require additional storage space for sealing elements. The sealing can be provided by very thin layers which combine to one sealing layer on the elements of the housing as soon as the casing elements are assembled. No separate parts must be inserted to the casing. The sealing guarantees a reliable gas tight connection to the casing elements since even accidental irregularities between the contact surfaces can be closed safely by the sealing contact of first and second casing element. As an example, a cylindrical battery according to the invention may have a diameter of less than 3 mm, in particular of less than 2.5 mm. The height of the battery may be e.g. about 1.0 mm. Therefore, the battery is suitable for applications wherein ultra compact (rechargeable) batteries are needed.

According to a preferred embodiment of the invention the void volume layer of one of the contact surfaces may be an anodized layer. The anodized layer is applied at least on the contact surface but also my be provided on other surfaces of the respective casing element except on surfaces that are to electrically contact the active material of the battery cell or an outside contact connected with the load. When manufacturing an anodized layer areas which shall not be anodized can be covered for example by an adhesive film. Or all surfaces are anodized and the layer is removed from surfaces, which are not supposed to be covered. Preferably the void volume layer is designed as a ceramic oxide layer, e.g. from $Al_2O_3$, $SiO_2$ or the like. The formable material layer is for example a layer of a suitable metal, in particular a gold or indium layer. But also plastic materials can be used as long as they are formable to reach into voids and openings of the porous void volume layer. In particular a PTFE-layer may be used. Basically the layers are provided as coatings on the first and/or second casing elements. But in principle, the first and second casings themselves may be produced of the respective material layer.

In a preferred embodiment, one of the first and second casing elements is made from gold or gold-plated copper. The other element, carrying the void volume layer, may be e.g. from Aluminium.

In one embodiment of the battery cell casing according to the invention the void volume layer is covered with a second formable material layer in addition to the first formable material layer. The second formable material layer consists of the same or other formable material as the first formable material layer on the surface of the other casing element without the void volume layer. In particular, the second formable material layer on the void volume layer has a smaller thickness than the first formable material layer, preferably about 100 to 400 nm, in particular about 150 to 200 nm. In the assembled position of the casing elements the first and second formable material layers are pressed onto each other such that at least the second layer is introduced into the porous material of the void volume layer. Preferably also the first formable material layer partially extends into the void volume layer.

The casing for the battery cell according to the invention is preferably cylindrically formed, wherein the first and the second casing elements are of circular shape with a bottom wall and a top wall respectively, and circular surrounding walls. One of the first and second casing element is of slightly smaller diameter, such that the contact surfaces can be arranged between the surrounding walls. Mostly the upper casing element comprising the top wall is smaller than the lower casing element comprising the bottom wall. The contact surface of the upper casing element is provided on the outer circumferential area of the circular wall. The contact surface of the lower casing element is provided on the inner circumferential area of the circular wall. Thus the circular wall of the upper casing element can be introduced into the circular wall of the bottom casing element and the respective contact surfaces contact each other. In the assembled position the casing element with the larger diameter, i.e. the upper casing element, defines an outer casing element and the one with the smaller diameter, i.e. the lower casing element, defines an inner casing element. Preferably the walls of the first and second casing elements comprise a thickness of 0.08 to 0.12 mm, preferably about 0.10 mm. As a matter of course, if larger batteries according to the invention are manufactured (such as e.g. cylindrical batteries having a diameter of 5 mm or more) the wall thickness will be increased in order to ensure mechanical stability of the battery.

The active material of the battery cell comprises an electrode material, which may be housed in the outer casing element, and a complementary electrode material, which may be housed in an inner casing element. In the assembled position the inner casing element is introduced into the outer casing element and the electrode materials are arranged above each other and separated by a separation layer. Preferably the separation layer is located inside the outer casing element and terminates the contact surface on the inner wall surface of the casing element and can serve as the separation layer between the electrode materials.

Also a contact layer may be provided on the front side of an inner casing element which faces the interior space within the outer casing element. The outer casing element may comprise the separation layer above the electrode material, which is designed as the contact surface with the void volume layer of the outer casing element. In this case the void volume layer surface is provided as a layer spun between the interior wall of the outer casing element.

Other advantageous embodiments and combinations of features are apparent from the detailed description below and the totality of the claims.

BRIEF DESCRIPTION OF THE DRAWINGS

The drawing used to explain the embodiment shows:
FIG. 1 a cross sectional view of a battery cell casing according to the invention.

In FIG. 1 an embodiment of a battery cell casing according to the invention is shown in an assembled position, comprising a first outer casing element 1 (can) and a second inner casing element 2 (lid). The outer casing element 1 has a circular shape with a surrounding wall 3 and a bottom wall 4. Basically the first casing element 1 is cup-shaped and consists of CuPb1P, gold-plated. The gold layer is a layer of formable material. The outer diameter of the first casing element 1 is 2.08 mm, the wall thickness amounts to 0.10 mm. The height of the first casing element 1 is 1.0 mm.

The inner casing element 2 as well has a circular shape with surrounding walls 5 and a top wall 6. Its wall thickness is again 0.10 mm. Generally the second casing element 2 forms a cover or lid for the cup-shaped first casing element 1. The outer casing element 1 comprises a first inner contact surface 7. The inner casing 2 comprises a second outer contact surface 8. The inner casing element 2 consists of aluminium, the outer side of the surrounding walls 5, i.e. the contact surface 8, as well as of the top wall 6 is anodized, i.e. comprises an outer layer (void volume layer) of $Al_2O_3$. Partially, namely in the region of the contact surface 8, the anodized layer is covered by a gold layer. A central circular part of the outer surface of the top wall 6 is not covered by an anodized layer but by a gold layer.

The interior of the battery contains the active elements of the battery known as such, e.g. the active elements of a Lithium Ion cell. In the FIGURE, these elements are only schematically displayed. In the bottom part of the outer casing element 1 electrode material 9 is arranged on the bottom wall 4. A complementary electrode material 10 is housed in the inner casing element 2. In the assembled position shown the electrode material 9 and the complementary electrode material 10 are arranged above each other but they are separated by a separation layer 11. The electrode material comprises several anode or cathode layers, electrolyte layers and electrical conductors, which are not explained in more detail herein. It is to be noted that the invention allows for geometry of the battery that provides a generally cylindrical space for the electrode material 9 having a diameter of more than 1.8 mm and a height of 0.39 mm. The space for the complimentary electrode material 10 which is cylindrical as well, has a diameter of about 1.6 mm and a height of 0.33 mm.

When the inner casing element 2 is inserted into the outer casing element 1 the formable material layer is pressed on the void volume layer such that the formable material fills voids on the surface of the void volume layer. The front of the surrounding wall 5 rests on the separation layer 11. Thus outer and inner casing element 1 and 2 are gas tightly connected and simultaneously the outer casing element 1 is electrically insulated from the inner casing element 2.

The coatings on the inner casing element 2 may be e.g. manufactured as follows. First of all, the inner casing element 2 is put onto a rack such that the inner surface of the top wall 6 as well as of the surrounding wall 5 are contacting the rack. The central region 6a on the outer surface of the top wall 6 is covered by a protective coating. Next the accessible surfaces of the inner casing element 2 are anodized with a process known as such in order to create a ceramic $Al_2O_3$ layer having a minimum thickness of about 3 µm. However, the thickness of the layer may vary between 3-8 µm. Subsequently, the protective coating in the central region 6a is removed and another protective coating is applied on that region of the outer surface of the top wall 6 that surrounds the central region 6a. Next, the accessible surfaces are gold plated, e.g. in a PVD process known as such. Finally, the protective coating is removed. Therefore, the inner surface of the inner casing element 2 contacting the rack are raw aluminium, the outer surfaces of the surrounding wall 5 are covered first with a ceramic layer and second with a gold layer. The central region 6a on the outer surface of the top wall 6 is covered by a gold layer whereas the rest of the outer surface of the top wall is covered by a ceramic layer only.

Alternatively, the first protective coating might be omitted and the ceramic layer might be removed in the central region 6a using e.g. a laser.

In summary, it is to be noted that a battery cell casing according to the invention offers a reliable button battery with an excellent size energy capacity ratio and which is easy to produce.

The invention claimed is:

1. Battery cell casing comprising a first casing element (1) with a first contact surface (7) and a second casing element (2) with a second contact surface (8), wherein in an assembled position the first and second contact surfaces (7, 8) contact each other and the first and second casing elements (1, 2) encase active materials (9, 10) of a battery cell in an interior space, and wherein at least one gas-tight seal layer is arranged between the first and second contact surfaces (7, 8) to seal the interior space, characterized in that one of the first and second contact surfaces (7; 8) comprises an electrically insulating void volume layer and the other of the first and second contact surfaces (7; 8) comprises a formable material layer, which fills voids on a surface of the void volume layer hermetically in the assembled position to form the seal layer.

2. Battery cell casing according to claim 1, wherein the void volume layer is an anodized layer.

3. Battery cell casing according to claim 1, wherein the void volume layer is a ceramic oxide layer.

4. Battery cell casing according to claim 1, wherein the formable material layer is a metal layer.

5. Battery cell casing according to claim 1, wherein the void volume layer is covered with a second formable material layer.

6. Battery cell casing according to claim 5, wherein the second formable material layer on the void volume layer is about 100 to 400 nm.

7. Battery cell casing according to claim 1, wherein the first and the second casing elements (1, 2) are of circular shape with a bottom wall (4) and a top wall (6) respectively, and the second casing element (2) has a first surrounding wall (3, 5), and the first casing element (1) has a second surrounding wall (6) wherein one of first and second casing elements (1; 2) is of slightly smaller diameter, such that the first and second contact surfaces (7, 8) are arranged between the first and second surrounding walls (3, 5).

8. Battery cell casing according to claim 1, wherein walls (3, 4, 5, 6) of the first and second casing elements (1, 2) have a thickness of 0.08 to 0.12 mm.

9. Battery cell casing according to claim 1, wherein an outer diameter of the casing is below 3 mm.

10. Battery cell casing according to claim 1, wherein the active materials comprise an electrode material (9) housed in a first casing element (1) and a complementary electrode material (10) housed in second casing element (2), wherein in the assembled position the second casing element (2) is introduced into the first casing element (1) and the complementary electrode material (10) is arranged above the electrode material (9) and separated by a separation layer (11).

11. Battery cell casing according to claim 10, wherein the separation layer (11) inside the first casing element terminates the contact surface on an inner wall surface (7) of the first casing element.

12. Battery cell casing according to claim 1, wherein one of the first or second casing elements (1, 2) is made from gold or gold-plated copper.

13. Battery cell casing according to claim 4, wherein the formable material layer is a gold or indium layer.

14. Battery cell casing according to claim 6, wherein the second formable material layer on the void volume layer is about 150 to 200 nm thick.

15. Battery cell casing according to claim 8, wherein walls (3, 4, 5, 6) of the first and second casing elements (1, 2) have a thickness of about 0.10 mm.

16. Battery cell casing according to claim 9, wherein an outer diameter of the casing is below 2.5 mm.

17. Battery comprising an interior of the battery with active elements and a battery cell casing, said cell casing comprising a first casing element (1) with a first contact surface (7) and a second casing element (2) with a second contact surface (8), wherein in an assembled position the first and second contact surfaces (7, 8) contact each other and the first and second casing elements (1, 2) encase active materials (9, 10) of a battery cell in an interior space, and wherein at least one gas-tight seal layer is arranged between the first and second contact surfaces (7, 8) to seal the interior space, characterized in that one of the first and second contact surfaces (7, 8) comprises an electrically insulating void volume layer and the other of the first and second contact surfaces (7, 8) comprises a formable material layer, which fills voids on a surface of the void volume layer hermetically in the assembled position to form the seal layer.

18. Battery, according to claim 17, wherein the void volume layer is an anodized layer.

19. Battery according to claim 17, wherein the void volume layer is a ceramic oxide layer.

20. Battery according to claim 17, wherein the formable material layer is a metal layer.

21. Battery according to claim 20, wherein the formable material layer is a gold or indium layer.

22. Battery according to claim 17, wherein the void volume layer is covered with a second formable material layer.

23. Battery according to claim 22, wherein the second formable material layer on the void volume layer is about 100 to 400 nm.

24. Battery according to claim 23, wherein the second formable material layer on the void volume layer is about 150 to 200 nm thick.

25. Battery according to claim 17, wherein the first and the second casing elements (1, 2) are of circular shape with a bottom wall (4) and a top wall (6) respectively, and the second casing element (2) has a first surrounding wall (5), and the first casing element (1) has a second surrounding wall (6) wherein one of first and second casing elements (1, 2) is of slightly smaller diameter, such that the first and second contact surfaces (7, 8) are arranged between the first and second surrounding walls (3, 5).

26. Battery according to claim 17, wherein walls (3, 4, 5, 6) of the first and second casing elements (1, 2) have a thickness of 0.08 to 0.12 mm.

27. Battery according to claim 26, wherein walls (3, 4, 5, 6) of the first and second casing elements (1, 2) have a thickness of about 0.10 mm.

28. Battery according to claim 17, wherein an outer diameter of the casing is below 3 mm.

29. Battery according to claim 28, wherein an outer diameter of the casing is below 2.5 mm.

30. Battery cell casing according to claim 17, wherein the active materials comprise an electrode material (9) housed in a first casing element (1) and a complementary electrode material (10) housed in second casing element (2), wherein in the assembled position the second casing element (2) is introduced into the first casing element (1) and the complementary electrode material (10) is arranged above the electrode material (9) and separated by a separation layer (11).

31. Battery cell casing according to claim 30, wherein the separation layer (11) inside the first casing element terminates the contact surface on an inner wall surface (7) of the first casing element.

32. Battery cell casing according to claim 17, wherein one of the first or second casing elements (1, 2) is made from gold or gold-plated copper.

\* \* \* \* \*